UNITED STATES PATENT OFFICE.

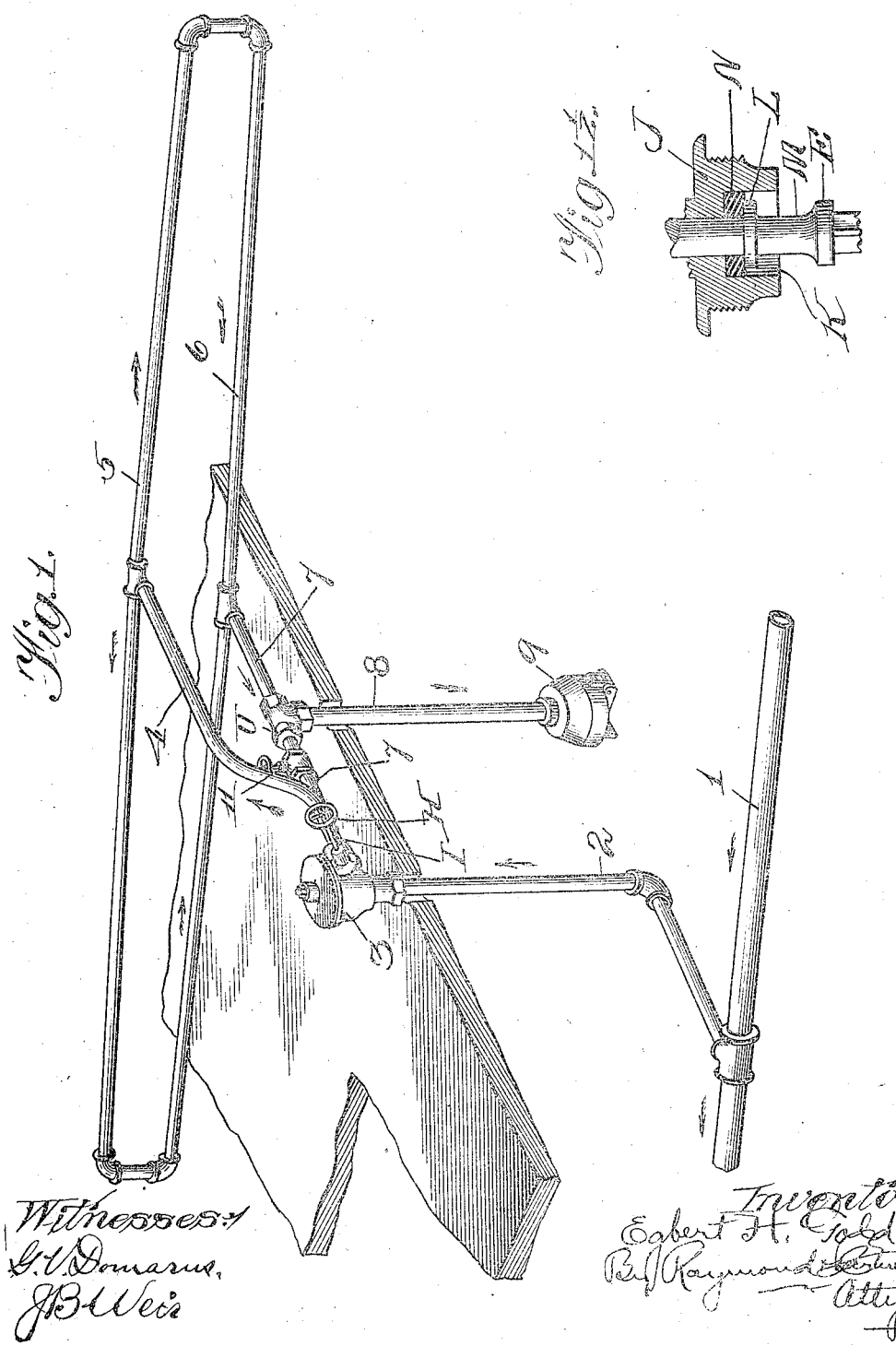

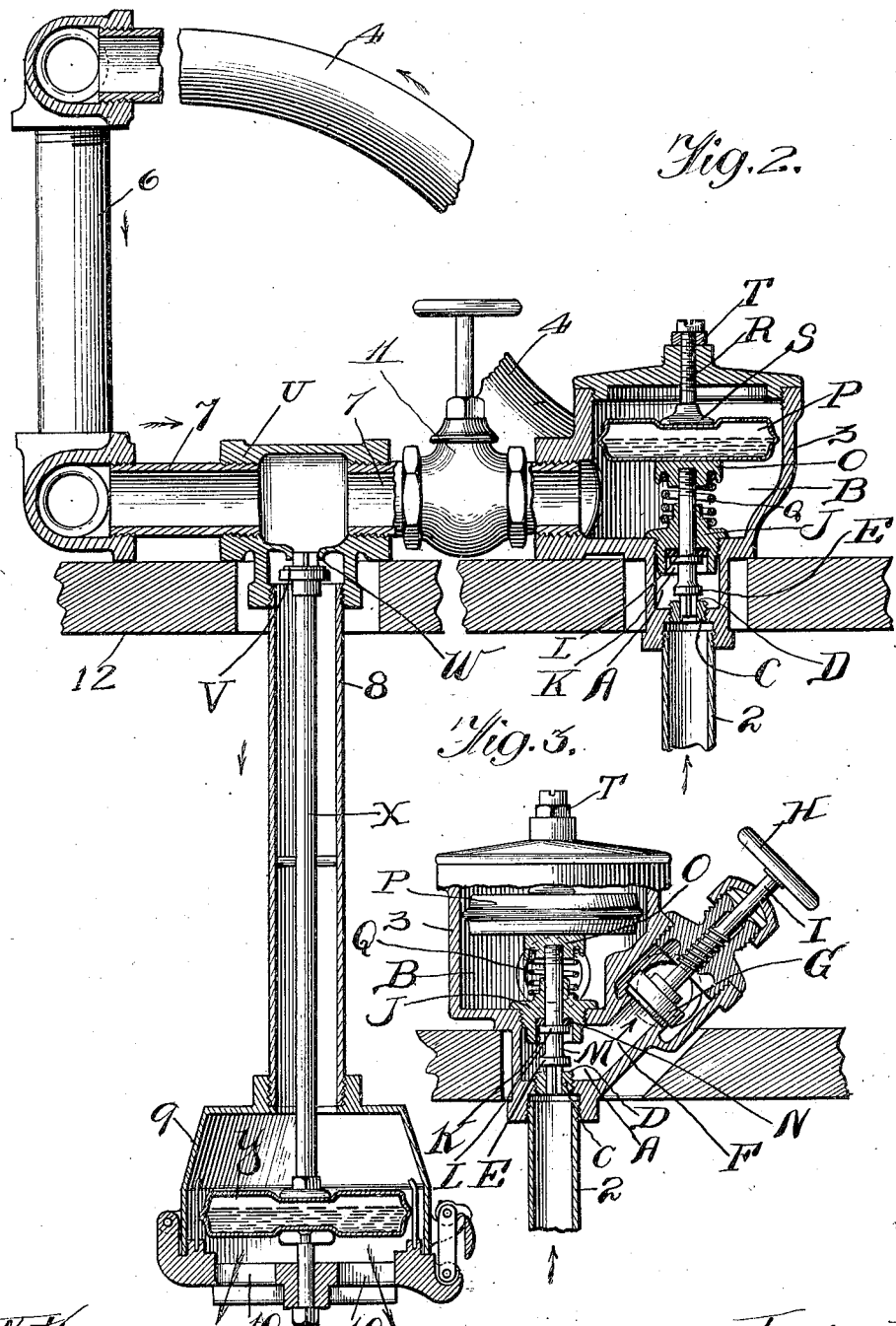

EGBERT H. GOLD, OF CHICAGO, ILLINOIS.

HEATING SYSTEM.

944,187.     Specification of Letters Patent.     Patented Dec. 21, 1909.

Application filed January 27, 1905. Serial No. 242,921.

To all whom it may concern:

Be it known that I, EGBERT H. GOLD, a citizen of the United States, residing at Chicago, in the county of Cook and State of Illinois, have invented certain new and useful Improvements in Heating Systems, of which the following is a specification.

My invention relates to improvements in apparatus for heating, and especially to improvements in car heating apparatus.

One object of my invention is to provide an automatically operating system, whereby a substantially closed system of radiating pipes will be kept supplied with a heating medium at a lower pressure than that of the heating medium in the supply pipe.

Another object of my invention is to provide an apparatus for such a system, which shall be operated, by thermostatic conditions within said system, to control the supply so as to maintain the heating medium in said system at a desired temperature or pressure, and to provide an adjustable feature whereby such temperature or pressure in said system may be varied as required.

These and various other objects are attained by my invention which is more fully set forth in the herein-appended claims and is shown in a convenient embodiment thereof in the hereto-attached drawings, in which—

Figure 1 shows in perspective and diagrammatically a heating system, especially adapted for car heating, and comprising my present invention. Fig. 1½ is an enlarged detail. Fig. 2 is an enlarged sectional detail of the control apparatus and the drip or blow-off trap; and Fig. 3 is another sectional detail of the automatic control device.

Like characters of reference indicate the same parts in the several figures of the drawings.

Referring to the accompanying drawings, 1 indicates the supply pipe, such as the train-pipe in a car heating system; 2 is the feed-pipe leading to the radiating system in the car; 3 is the casing of the control apparatus; 4, 5, and 6 are circulating pipes; 7 is the return pipe; 8 is the blow-off or drip; and 9 is the casing of the automatic trap. 12 is the car floor.

The casing 3 is divided into an inlet chamber A and a diaphragm chamber B. The feed-pipe 2 communicates with the inlet chamber A through a nipple C, which nipple is mounted in an inlet port connecting the chamber A with the feed-pipe 2 and projects upwardly to form a valve seat D. The valve-seat D is adapted to receive the valve E.

The inlet chamber A leads through an upwardly inclined passage-way F to a shut-off valve G of any suitable type. As shown, the shut-off valve G is provided with a hand wheel H, which connects with the valve through its stem I.

The shut-off valve H, which is closed when the heating system is out of service, controls communication between the inlet chamber A and the circulating system through the pipe 4. The pipe 4 conveys steam, or other heating fluid, to the pipe 5, whence the heating medium flows in both directions back into the pipe 6, and thence, through the outlet pipe 7, to the diaphragm chamber B of the casing 3.

Communication between the diaphragm chamber B and the inlet chamber A of the casing 3 is conveniently closed by a perforated nipple J, which is provided with a recess K. This recess K is arranged to receive a flange L on the stem M of the valve E.

Loosely mounted on the valve stem M, and above the collar L, is a washer N made of compressible material. The valve stem M projects through the nipple J and into the diaphragm chamber B, where it is screwed into a button O, upon which rests the expansible diaphragm P. Surrounding the valve stem M is a spring Q, one end of which rests upon the upper face of the nipple J and the other end of which is seated upon the button O. It is thus seen that the diaphragm P, the valve stem M and the valve E are normally supported by the spring Q.

Screw-threaded through the casing 3 is an adjusting stem R, the lower end of which is provided with a button S which abuts against the upper face of the diaphragm P. The stem R is provided with any suitable means for holding it in any given adjustment, such, for example, as the lock-nut T.

The circulating system is provided with an automatic trap, which may be conveniently, but not necessarily, connected with the pipe 7 adjacent to the casing 3. As shown, the pipe 7 is divided and its abutting ends are connected with a union U. This union is provided with a port which leads into the drip or blow-off pipe 8, which, in turn, communicates with the diaphragm casing 9, from which ports 10 lead to the atmosphere, or to any other suitable exhaust.

The blow-off port in the union U is controlled by a familiar form of apparatus, comprising a valve V adapted to engage the seat W so as to close said port, and connecting by the stem X with the expansible diaphragm Y which is mounted in the casing 9.

The operation of this apparatus is as follows: When the heating medium, such as steam, is turned on and the valve G is open, the diaphragm P, being cold, will be contracted and the spring Q will hold the valve E in open position. Steam from the train-pipe 1 will flow through the feed-pipe 2 into the inlet chamber A, thence, through the inclined passage F and the valve G, into the pipe 4, around through the circulating system and back through the pipe 7, forcing the cold air and any accumulated water of condensation out through the pipe 8 which thus serves as a blow-off. When live steam, following the cold air and water, flows through the pipe 8 and surrounds the diaphragm Y in the casing 9, the valve V will close the blow-off port, and the circulating system will become a closed system.

If the diaphragm P be set to operate the same as the diaphragm Y, it will expand at substantially the same time that the diaphragm Y expands and, compressing the spring Q, will close the valve E and shut off the inflow of steam. This condition will continue until the cooling of the diaphragm Y causes it to contract and to open the valve V. If, however, notwithstanding the contraction of the diaphragm Y, which is preferably in an exposed position, the temperature within the more protected pipes of the circulating system remains at the desired point, the valve E will remain closed and, in the absence of pressure at the inlet end of the circulating system, there will be no escape of the heating medium through the blow-off pipe 9, notwithstanding the fact that the valve V is open. Such opening of the valve V will merely permit of the escape of any water of condensation which may accumulate. As soon, however, as the diaphragm P begins to contract, the valve E will open and live steam at high pressure will flow into the pipes and, consequently, steam or heated vapor will fill the blow-off pipe 8 and surround the diaphragm Y in the casing 9 and, as the temperature rises, the diaphragm Y expanding will again close the blow-off port, and steam will continue to flow into the system until the diaphragm P in the casing 3 is again expanded sufficiently to close the inlet valve E. It will thus be seen that, if, for any reason, the diaphragm P fails to operate perfectly or promptly in closing the valve E, nevertheless there can be no waste of steam to the atmosphere, because the system will be closed and the only result will be to fill the circulating pipes with the heating medium at a higher pressure. It should be understood, however, that the foregoing operation relates, primarily, to the apparatus when set to operate at the atmospheric temperature of steam. If, however, it be desired to maintain a higher temperature within the circulating pipes, the adjusting screw R will be set at a higher adjustment, so that, the diaphragm P being free to expand for a certain extent, without opposition, in the direction of the button S, it will require a greater expansion of the diaphragm P, and consequently a higher temperature within the diaphragm chamber B, before the diaphragm P will abut against the unyielding button S and begin to compress the spring Q and close the valve E. Under these circumstances, the drip, or trap, diaphragm Y will close whenever surrounded by steam at atmospheric temperature, thereby providing a closed system, which permits the pressure and temperature of the steam within the circulating system to rise to that degree which is required to sufficiently expand the diaphragm P under its new adjustment, so as to close the inlet valve E. Now, applying the same principle a step farther, it will be seen that by still further adjusting the screw R, so as to furnish no effective abutment for the expansive diaphragm P, the diaphragm P can be put out of operation; that is to say, the parts being so adjusted that the diaphragm P will engage no rigid abutment before it reaches its limit of expansion, it follows that under such conditions there will be no closure of the valve E and the circulating system will be in free communication with the supply, and thus will be converted into a high pressure heating system, closed, except as to the drip or blow-off port, which will be more or less open through the operation of the diaphragm Y. Inasmuch, however, as there may be danger of damage if the diaphragm P is exposed to an indefinitely high pressure and is left, under such circumstances, to expand indefinitely, I interpose a valve 11 between the union U and the casing 3, so that when it is desired to use a direct pressure system, the closing of the valve 11 will cut out the automatic controlling device, while with the valve 11 open, the automatic controlling device may be adjusted to operate at different pressures, as desired. It is thus seen that with my present arrangement I provide a convertible system, which may be adjusted so as to operate, at will, either as a low pressure system arranged to be substantially filled at all times with steam at atmospheric pressure, or a high pressure system arranged to be filled at all times with steam at train-pipe pressure, or a system adaptable to adjustment to any pressure or temperature between these two extremes. So much for the broad features of my invention.

It will be noted that when the valve E is open, the expansion of the spring Q, as well as the pressure of the in-rushing steam, will press the collar L on the valve stem M tightly against the expansible washer N, thereby making a sufficiently tight joint for preventing the flow of steam through the nipple J into the diaphragm chamber B. This device, however, is not a part of my present invention and is, therefore, not claimed herein, although the right is reserved to suitably protect it by a separate application.

As a minor feature of my present invention, it will be noted that the connection of the inlet chamber A with the valve G, through the upwardly inclined passage F, provides perfect drainage for the escape of water of condensation through the pipe 2 into the train-pipe whenever a car fitted with this heating system is disconnected from the engine.

Although I have shown and described my invention as applied to a car, and as peculiarly adapted for heating a car, or a train of cars, and although I specifically claim my invention in this combination, it should be understood that I am not necessarily limited thereto. So, also various changes in detail will occur to the skilled mechanic, as a matter of convenience or adaptation, without departing from the spirit of my invention, and all such changes are contemplated hereby.

I do not here broadly claim the combination with automatically controlled inlet and outlet valves, of means for converting a heating system into a high pressure system or a low pressure system at will, that subject matter being involved in my co-pending application No. 245,311.

I claim:

1. The combination with a radiating system having an outlet, of means for supplying a heating medium to said system, a thermostat adapted to be brought into free communication with said system and arranged to operate to shut off said supply, and means, independent of said thermostat, for closing said outlet.

2. The combination with a radiating system provided with an outlet, of a thermostat adapted to be continuously affected by the thermostatic condition of the heating medium within said system and arranged to control the inflow from said supply, and means, independent of said thermostat, for automatically opening and closing said outlet.

3. The combination with a radiating system provided with an outlet, of a thermostat actuated and adapted to be continuously acted upon by the condition of the heating medium in said system, and arranged to control the supply of the heating medium to said system, and thermostatically operated means, independent of said first-named thermostat, arranged to automatically open and close said outlet.

4. The combination with a radiating system provided with an outlet, of a thermostat actuated by and adapted to be continuously subjected to the thermostatic conditions in said system, and arranged to control the supply of the heating medium thereto, and means, independent of said thermostat, for automatically opening and closing said outlet, said means being actuated in part by thermostatic conditions externally of said system.

5. The combination with a radiating system provided with an outlet, of an expansion device arranged to be actuated by and adapted to be continuously subjected to thermostatic conditions in said system to control the inflow of the heating medium thereto, and an automatic trap, independent of said expansion device, arranged to control said outlet.

6. The combination with a normally closed radiating system, provided with an automatically controlled drip outlet, of means, independent of the device for controlling said drip outlet, adapted to be actuated by and to be continuously subjected to thermostatic conditions in said system, so as to control the inflow of a heating medium thereto.

7. The combination with a heating system of thermostatically operated means, in communication with said system, for controlling the supply of a heating medium to said system, and means for closing communication, at will between said system and the thermostatic element of said thermostatically operated means.

8. The combination with a radiating system provided with an outlet, of means for opening and closing said outlet as required, means, independent of said outlet controlling means, adapted to be actuated by and to be continuously exposed to thermostatic conditions within said system so as to control the inflow of a heating medium thereto, and means for adjusting said controlling device so as to control such inflow at different predetermined temperatures of the heating medium in the radiating system.

9. The combination with a radiating system provided with an automatically operating steam-trap, of means for controlling the inflow of a heating medium to said system, said means comprising an expansible diaphragm exposed within said system, a valve adapted to be operated by the expansion of said diaphragm to shut off the inflow of the heating medium of said system, a spring arranged to open said valve, an abutment for said diaphragm, and means for adjusting the position of said abutment so as to vary the operation of said controlling means.

10. The combination with a radiating system, of a casing provided with an inlet chamber and an expansion chamber, means adapted to be operated by thermostatic conditions within said expansion chamber for controlling the inflow of a heating medium into said inlet chamber, a valve mounted in said casing and arranged to control the flow of the heating medium from said inlet chamber to the radiating system, said inlet chamber being extended to form an upwardly inclined passage leading to said valve.

11. The combination with a heating system having an automatically controlled outlet, of thermostatic means in communication with said system, for controlling the flow of a heating medium thereto, and means whereby the thermostatic element of said inflow controlling means, may be cut into or out of communication with said system at will.

12. The combination with a system of circulating pipes provided with an outlet, of means for automatically controlling said outlet, a thermostat separate from said outlet closing means and located so as to be operatively influenced by steam flowing from the effective radiating portion of said system, an inlet valve in operative relation to said thermostat and arranged to control the inflow to said system, and a non-automatic valve arranged to control the flow of steam to a point where it will operatively influence said thermostat.

13. In a heating system, the combination with a radiating system provided with a blow-off, of means for opening and closing said blow-off, means for supplying a heating medium to said system at high pressure, means adapted to be actuated by thermostatic conditions within said system, for automatically controlling the inflow to said system from said supply so as to maintain a relatively low pressure in said system, and means for cutting the thermostatic member of said automatic controlling device out of communication with said system so as to convert said system, at will, into a high pressure system.

14. The combination with a radiating system provided with a blow-off, of means for opening and closing said blow-off, means for supplying a heating medium to said system at high pressure, means adapted to be operated by thermostatic conditions within said system for controlling the inflow to said system from said supply so as to maintain the heating medium in said system at a relatively low pressure, means for adjusting said automatic device so as to maintain different pressures within said system, and means for cutting said automatic device out of communication with said system so as to leave said system in open communication with said supply.

15. The combination with a system of circulating pipes provided with an outlet, of means adapted to be automatically operated by the condition of a fluid medium contained in said system to control the flow of a fluid heating medium into said system, means for closing said outlet, and means for cutting said automatic means out of communication with said system.

16. In a radiating system provided with an inlet and with a single outlet, means for closing said outlet and a thermostat independent of said outlet closing means, adapted to be operated by the condition of heating medium in said system to control the inflow of a heating medium through said inlet.

17. In a radiating system provided with an inlet and with but a single outlet, a thermostatic device adapted to close said outlet, and a thermostat independent of said first named thermostatic device, adapted to be operated by the condition of the heating medium in said system to control the inflow of a heating medium through said inlet.

18. The combination with a system of circulating pipes provided with an outlet, of means for automatically opening and closing said outlet in response to thermostatic conditions, means, adapted to be operated by thermostatic conditions within said system, to control the inflow to said system of a heating medium, and a valve so disposed in said system as to shut off the heating medium from operative relation to said inlet controlling device, without interfering with the continued operative relation between said heating medium and said outlet controlling device.

19. The combination with a radiating system provided with an automatically operated steam trap, of means independent of the steam trap for controlling the inflow of a heating medium to said system, said means comprising an expansible thermostat exposed to the thermostatic condition of the heating medium within said system, an inlet valve arranged to be operated by the expansion of said thermostat, and means for adjusting the operative relation between said thermostat and said inlet valve so as to vary the extent to which said valve will be closed by the expansion of said thermostat at a given temperature.

20. The combination with a radiating system having an outlet, of means for supplying a heating medium to said system, a thermostat arranged to be, at will, continuously and operatively affected by the flow of heating medium from the effective radiating portion of said system and arranged to control the inflow from said supply, a non-automatic valve arranged to be positively opened and closed to control the operative relation between the heating medium in said system and said thermostat, and means independent of said thermostat for closing said outlet.

21. The combination with a radiating system provided with a source of supply and an outlet, of a thermostat adapted to be continuously affected by the thermostatic condition of the heating medium within said system and arranged to control the inflow from said supply, means for varying or nullifying the operative effect of the thermostat in controlling the supply, and means independent of said thermostat for automatically opening and closing said outlet.

22. The combination with a radiating system provided with an outlet, of a thermostat actuated and adapted to be continuously acted upon by the condition of the heating medium in said system and arranged to control the supply of the heating medium to said system, means for varying or nullifying the operative effect of the thermostat in controlling the supply, and thermostatically operated means independent of said first-named thermostat arranged to automatically open and close said outlet.

23. The combination with a radiating system provided with an outlet, of a thermostat actuated by and adapted to be continuously subjected to the thermostatic conditions in said system and arranged to control the supply of the heating medium thereto, means for varying or nullifying the operative effect of the thermostat in controlling the supply, and means independent of said thermostat for automatically opening and closing said outlet, said means being actuated in part by thermostatic conditions external of said system.

24. The combination with a radiating system provided with an outlet, of an expansion device arranged to be actuated by and adapted to be continuously subjected to thermostatic conditions in said system to control the inflow of the heating medium thereto, means for varying or nullifying the operative effect of the thermostat in controlling the supply, and an automatic trap independent of said expansion device arranged to control the outlet.

25. The combination with a normally closed radiating system provided with an automatically controlled drip outlet, of means independent of the device for controlling the drip outlet adapted to be actuated by and to be continuously subjected to thermostatic conditions in the system, so as to control the inflow of a heating medium thereto, and means for varying or nullifying the operative effect of the thermostat in controlling the supply.

EGBERT H. GOLD.

Witnesses:
O. R. BARNETT,
M. E. SHIELDS.